(12) United States Patent
Hirasawa (10) Patent No.: US 6,981,647 B2
(45) Date of Patent: Jan. 3, 2006

(54) FOREIGN MATTER DETECTING MECHANISM, CARRIAGE MOVING MECHANISM AND METHOD FOR OPERATING CARRIAGE MOVING MECHANISM

(75) Inventor: Kenji Hirasawa, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 10/416,667

(22) PCT Filed: Nov. 19, 2001

(86) PCT No.: PCT/JP01/10093

§ 371 (c)(1),
(2), (4) Date: May 13, 2003

(87) PCT Pub. No.: WO02/41243

PCT Pub. Date: May 23, 2002

(65) Prior Publication Data

US 2004/0020991 A1 Feb. 5, 2004

(30) Foreign Application Priority Data

| Nov. 17, 2000 | (JP) | ............................ 2000-350690 |
| Dec. 5, 2000 | (JP) | ............................ 2000-370485 |
| Dec. 5, 2000 | (JP) | ............................ 2000-370497 |
| Jun. 7, 2001 | (JP) | ............................ 2001-172967 |

(51) Int. Cl.
  *G06K 7/00* (2006.01)
(52) U.S. Cl. ...................... 235/486; 235/479; 235/380; 235/379; 235/435
(58) Field of Classification Search ................ 235/479, 235/375, 379, 380, 383, 475, 477, 492, 435, 235/437, 486, 483, 480, 381, 439, 446
See application file for complete search history.

(56) References Cited

U.S. PATENT DOCUMENTS

| 3,946,204 A | * | 3/1976 | Taniguchi et al. ........... 235/435 |
| 4,085,621 A | | 4/1978 | Hadaway |
| 5,801,368 A | | 9/1998 | Hayashi et al. |

(Continued)

FOREIGN PATENT DOCUMENTS

GB        2366650        3/2002

(Continued)

*Primary Examiner*—Karl D. Frech
*Assistant Examiner*—Daniel Walsh
(74) *Attorney, Agent, or Firm*—Notaro&Michalos PC (57) ABSTRACT

A foreign matter detection mechanism for detecting a foreign matter other than a carriage object for the purpose of, e.g., preventing illegal use of a card by detecting a foreign matter other than the card inserted into, e.g., a card reader, a carriage movement mechanism used in the foreign matter detection mechanism and the like, and a method for operating the carriage movement mechanism. The foreign matter detection mechanism (1) comprises foreign matter detection members (5a, 5b) having foreign matter engagement portions (6a, 6b) and move closer to or away from a traveling path (4), a movement mechanism (29) for moving the foreign matter detection members (5a, 5b) in a direction crossing the traveling path (4) respectively, and detecting means (8a, 8b) for detecting presence/absence of foreign matter detection by the foreign matter detection members (5a, 5b). The foreign matter detection members (5a, 5b) are attached to the movement mechanism (29) in such a manner that they thoroughly cut across an area through which a foreign matter (3) can pass when an object (2) does not exist in the traveling path (4) and they move while sliding on a lower surface of the object (2) when the object (2) exists in the traveling path (4).

8 Claims, 6 Drawing Sheets

U.S. PATENT DOCUMENTS

| | | | |
|---|---|---|---|
| 5,850,079 A * | 12/1998 | Ohwa et al. | 235/475 |
| 5,929,413 A * | 7/1999 | Gardner | 235/379 |
| 6,446,872 B1 * | 9/2002 | Imai et al. | 235/475 |
| 6,491,216 B1 * | 12/2002 | May | 235/375 |
| 6,574,058 B1 * | 6/2003 | Aruga et al. | 360/2 |
| 6,729,538 B2 * | 5/2004 | Farquhar | 235/379 |
| 6,824,062 B2 * | 11/2004 | Hirasawa | 235/479 |
| 2002/0030109 A1 * | 3/2002 | Farquhar | 235/475 |
| 2002/0088862 A1 * | 7/2002 | Imai et al. | 235/475 |
| 2002/0117550 A1 * | 8/2002 | Hirasawa | 235/479 |
| 2002/0153420 A1 * | 10/2002 | Nakamura et al. | 235/441 |
| 2005/0011324 A1 * | 1/2005 | Kawachi et al. | 83/469 |

FOREIGN PATENT DOCUMENTS

| | | | |
|---|---|---|---|
| JP | 03-067382 | | 3/1991 |
| JP | 03067382 | * | 3/1991 |
| JP | 03-111986 | | 5/1991 |
| JP | 05-42068 | | 6/1993 |
| JP | 07-31867 | | 4/1995 |
| JP | 08-272922 | | 10/1996 |
| JP | 09297879 | * | 11/1997 |
| JP | 11-045315 | | 2/1999 |

* cited by examiner

FOREIGN MATTER DETECTING MECHANISM, CARRIAGE MOVING MECHANISM AND METHOD FOR OPERATING CARRIAGE MOVING MECHANISM

TECHNICAL FIELD

The present invention relates to a foreign matter detection mechanism, a carriage movement mechanism, and a method for operating a carriage movement mechanism. More particularly, the present invention relates to a foreign matter detection mechanism provided to detect a foreign matter other than a carriage target object for the purpose of, e.g., detecting a foreign matter other than a card inserted into a card reader and thereby preventing illegal use of the card, a carriage movement mechanism used in this foreign matter detection mechanism and the like, and a method for operating the carriage movement mechanism.

TECHNICAL TERM

In this specification, a term "foreign matter" means various kinds of tools which are abused to prevent a smooth carrying operation of an object as a carriage target and cause a defect, including a corded member which causes a card to be caught in a card reader and intercepts traveling.

BACKGROUND ART

There have conventionally occurred crimes that a foreign matter is set in a card traveling path in a card reader such as an ATM (automated teller machine) or the like to steal other people's cards in order to illegally use them.

Although means for, e.g., detecting a foreign matter in the card traveling path is provided against such crimes, there is a system like a card reader disclosed in, e.g., U.S. Pat. No. 5,850,079 that a cutting edge is provided at an end of a shutter plate and a foreign matter such as a card trap member is cut.

In case of a structure that the card trap member is cut by the shutter plate like this card reader, however, the card may be damaged when the cutting edge is brought into contact with the lower surface of the card.

Further, Japanese patent application laid-open No. 272922/1996 discloses a foreign matter insertion detection mechanism (U.S. Pat. No. 3,035,725) which detects whether a foreign matter has been inserted by using a scanning member which scans an entire lateral widthwise area of a traveling path. Such a detection mechanism performs foreign matter detection in a state that the card is not taken into the card reader, i.e., that there is no card in the card traveling path because of the structure that the scanning member scans the entire lateral widthwise area of the traveling path.

In such a foreign matter insertion detection mechanism, however, even in the case that the card is inserted and taken into the card reader as well as the case that no card is provided, the detection capability can be further improved as long as a foreign matter can be detected, which is preferable in view of enhancement of the security property of the card reader.

Furthermore, in conventional card readers, there has been widely used a base which has an information recording medium or a recording head attached thereto or mounted thereon and can move in predetermined direction (in this specification, such a base which moves with a given object attached thereto or mounted thereon is referred to as a "carriage").

Figure 12:
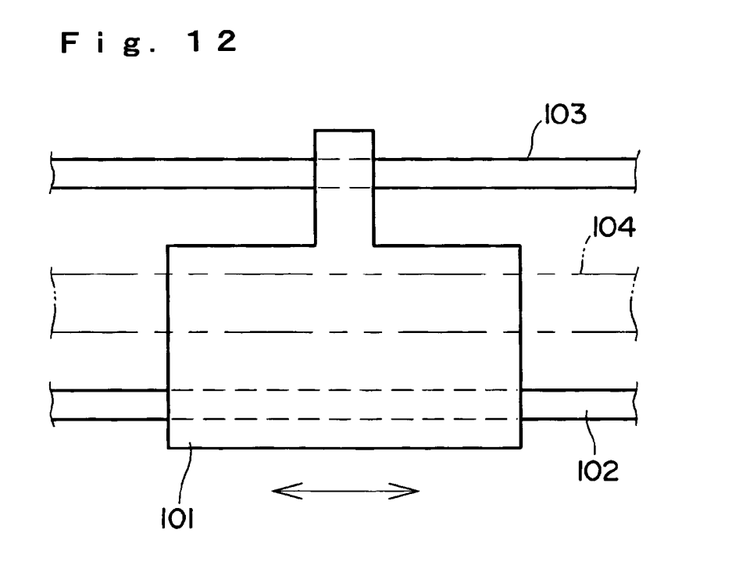
FIG. 12 is a schematic view showing a carriage movement mechanism in a conventional card reader.

As adopted in an apparatus disclosed in, e.g., Japanese patent application laid-open No. 42068/1993, such a carriage movement mechanism used to move a carriage is generally constituted by a slide shaft 102, a guide member 103 which restricts rotation of a carriage 101, and a drive belt 104 such as shown in FIG. 12.

Furthermore, like an apparatus disclosed in, e.g., Japanese patent application laid-open No. 31867/1995, guiding and rotation restriction of a carriage 101 are performed by two shafts while the carriage 101 is reciprocated by rotating a drive belt 104 in one direction.

In such a carriage movement mechanism, however, since the slide shaft 102, the guide member 103, the drive belt 104 and others require a large space, this mechanism cannot be utilized in a small apparatus in some cases. In particular, when the slide shaft 102 and the guide member 103 are arranged on the both sides of the carriage 101, a larger space may be required in some cases, thereby complicating minimization.

It is, therefore, an object of the present invention to provide a foreign matter detection mechanism which can cut or detect a foreign matter without damaging a card surface. Moreover, it is another object of the present invention to provide a foreign matter detection mechanism which can detect a foreign matter in a card reader irrespective of presence/absence of a card. In addition, it is still another object of the present invention to provide a carriage movement mechanism which is advantageous for minimization and a method for operating the carriage movement mechanism.

DISCLOSURE OF INVENTION

To achieve this aim, a foreign matter detection mechanism according to the present invention, comprises: a foreign matter detection member having a foreign matter engagement portion and being able to move closer to or away from a traveling path of an object; a movement mechanism for moving the foreign matter detection member in a direction crossing the traveling path; and detecting means for detecting presence/absence of foreign matter detection by the foreign matter detection member, wherein the foreign matter detection member is attached to the movement mechanism in such a manner that the foreign matter detection member thoroughly cuts across an area through which the foreign matter can pass when the object does not exist in the traveling path and it moves while sliding on the lower surface of the object when the object exists in the traveling path.

This foreign matter detection mechanism scans an entire area of the card traveling path similar to the prior art when there is no carriage object, e.g., a card, and it moves back to a position at which it comes into contact with the card surface and scans an area other than that blocked by the card while being in contact with the card surface when there is the card. Therefore, even after the card is inserted, a foreign matter in the card reader can be detected by scanning an area on one side of the card traveling path partitioned by the card. Additionally, even if, e.g., a filate or filament-shaped foreign matter has entered the card traveling path with insertion of the card, this foreign matter can be detected by scanning after insertion of the card, and the detection capability is high because detection is possible even if the filate foreign matter is stretched or lax. Therefore, the security property of the card reader can be further improved. Further, this foreign matter detection mechanism can be applied to a paper currency feed apparatus in which paper currency is a carriage object or any other apparatus.

Furthermore, in the foreign matter detection mechanism according to the present invention, it is preferable that the foreign matter engagement portion of the foreign matter detection member is constituted by a tabular portion, a concave portion into which the tabular portion moves is provided to the detecting means and the concave portion is formed to have a width that the tabular portion can pass through when the foreign matter is not engaged but it cannot pass through when the foreign matter is engaged.

In this case, if the foreign matter is thinner than a gap between the concave portion and the tabular portion, the foreign matter engagement portion can enter the concave portion together with the foreign matter even if it carries the foreign matter. On the other hand, if the foreign matter is thicker than the gap, the foreign matter engagement portion cannot enter the concave portion together with the foreign matter, and thus protrudes. Therefore, detecting a position of the foreign matter engagement portion can detect existence of the foreign matter having a thickness not less than a predetermined value. Furthermore, the thin foreign matter can be cut at the foreign matter engagement portion.

Moreover, in this foreign matter detection mechanism, it is preferable that the detecting means is arranged outside the traveling path and the foreign matter detection member is provided so as to get across the traveling path and detect a wider area than the width of the object. In this case, any foreign matter placed in the traveling path can be detected.

In addition, in this foreign matter detection mechanism, when a plurality of the foreign matter detection members are provided so that they can divide the traveling path and perform detection, decreasing the scanning stroke of each foreign matter detection member can shorten the time required for foreign matter detection.

Additionally, in this foreign matter detection mechanism, it is preferable that the foreign matter detection member consists of a pair of members which move from the central part of the traveling path to the outer side and carry out detection redundantly at the central part. In this case, a pair of the foreign matter detection members scan a detectable area in the traveling path exhaustively, and scanning of an area corresponding to approximately a half of the traveling path width by each foreign matter detection member can suffice, thereby reducing the time required for detection.

Further, according to the present invention, in the carriage movement mechanism in which a carriage moving in a predetermined direction is provided to a loop-like member driven by a motor and an object to be moved is attached to the carriage, the loop-like member is stretched between two rollers, constitutes a loop having two parallel portions, and rotates by the motor. The carriage is fixed to one of the two parallel portions, and this carriage is extended to the other parallel portion and guided by this parallel portion.

Therefore, when the loop-like member is rotated by the motor, one parallel portion and the other parallel portion move in opposed directions, and the carriage moves in one direction together with one parallel portion. At this moment, the other parallel portion guides the extended part of the carriage while moving in the opposite direction, and prevents the carriage from rotating around one parallel portion. Therefore, the carriage moves in the parallel manner in a predetermined direction without rotating around the axis of the parallel portion.

In this case, the loop-like member has both a function as a drive belt which drives the carriage, and a function as a guide shaft and a slide member for performing guiding and rotation restriction of the carriage. Therefore, since the carriage movement mechanism can be constituted without additionally providing the guide shaft, the slide member and the like, minimization of the apparatus is possible. Further, reduction in the cost can be facilitated.

Furthermore, in this carriage movement mechanism, two carriages can be provided, and one carriage can be fixed to one of the two parallel portions constituting the loop whilst the other carriage can be fixed to the other parallel portion. In this case, the respective carriages are provided to the upper and lower parallel portions of the loop-like member, and hence the two carriages can be simultaneously moved in different directions by rotation of one drive source (motor) in a single direction. Therefore, it is possible to realize the structure advantageous for minimization of the space and reduction in the cost. Moreover, as well as the carriage on one side, the carriage on the other side is guided by the parallel portion of the loop-like member, it can move in parallel without rotating around the axis of the parallel portion.

In addition, in this carriage movement mechanism, it is preferable that the motor is a stepping motor, the carriage is a movement member having attached thereto a foreign matter detection member which detects a foreign matter inserted into the card reader and the foreign matter detection member moves a distance which is approximately a half of the card traveling path when it moves in a direction crossing the card traveling path.

In this carriage movement mechanism, when the stepping motor is driven, the carriage (movement member) moves in the crossing direction together with the foreign matter detection member. The foreign matter detection member catches and detects the foreign matter in the card reader in the middle of moving. In this case, a plurality of the carriages are provided and the movement distance of each carriage is set to approximately a half of the card traveling path, thereby shortening the time required for foreign matter detection.

Additionally, the carriage is any one of a movement member on which the card is mounted, a movement member having a magnetic head attached thereto and a movement member having attached thereto a foreign matter detection member which detects a foreign matter inserted into the card reader, or any other movement member. According to the present invention, minimization of the carriage movement mechanism and reduction in the cost can be realized when the carriage takes any conformation.

Further, it is preferable that the foreign matter detection member includes the foreign matter engagement portion, which engages with a foreign matter, in both directions along which the foreign matter detection member moves. In this case, the foreign matter detection member can cause a foreign mater to engage when it moves in either direction. Therefore, missing out on detection can be reduced by detecting a foreign matter, which cannot be detected in scanning in one direction, during rescanning in the opposite direction. It is also possible to reduce missing out on detection when a foreign matter has, e.g., a wide sheet-like form.

Furthermore, it is preferable that the carriage movement mechanism according to the present invention includes a home position sensor which detects that the foreign matter detection member is placed at a home position through an intermediary member with which an end side of the foreign matter detection member comes into contact. In this case, the home position sensor can be used to detect whether the foreign matter detection member is placed at the home position and whether the end side of the foreign matter detection member has a defect.

Moreover, to achieve the above-described aim, a method for operating a carriage movement mechanism according to the present invention comprises the steps of: constituting a loop having two parallel portions by stretching a loop-like member between two rollers; fixing one of a pair of carriages to one of the two parallel portions constituting the loop and extending it to the other parallel portion so that it is guided by the other parallel portion so as not to rotate around the loop like member; and fixing the other carriage to the other one of the two parallel portions and extending it to one parallel portion so that it is guided by this parallel portion so as not to rotate around the loop-like member, thereby reciprocating the two carriages so as to move closer to or away from each other.

In this case, when the loop-like member is rotated, one parallel portion and the other parallel portion move in the opposed directions, one movement member moves in one direction together with one parallel portion, while the other movement member moves in the opposite direction together with the other parallel portion. That is, a pair of the movement members move so as to get closer to or away from each other. At that time, the parallel portion on the other side guides the extended part of one movement member while moving in the opposite direction, and prevents this movement member from rotating around one parallel portion. Therefore, one movement member moves in parallel in a predetermined direction without rotating around the axis of the parallel portion. This is also true to the other movement member, and it does not rotate around one parallel portion.

In this case, the loop-like member has both a function of a drive belt which drives the movement members, and a function of a guide shaft and a slide member for performing guiding and rotation restriction of the movement members. Therefore, the carriage movement mechanism can be constituted without additionally providing the guide shaft, the slide member and the like, which is advantageous for minimization of the mechanism adopting this operating method. Also, reduction in the cost can be facilitated.

In addition, in this method of operating the carriage movement mechanism, it is preferable that a foreign matter detection member which detects a foreign matter inserted into a card reader is provided to the carriage and a foreign matter engagement portion which engages with a foreign matter is provided to the foreign matter detection member in both directions along which the foreign matter detection member moves. In this case, the foreign matter detection member can engage with the foreign matter when moving in either direction. Therefore, missing out on detection can be reduced by detecting a foreign matter, which cannot be detected by scanning in one direction, during rescanning in the opposite direction. Additionally, it is possible to decrease missing out on detection when a foreign matter has, e.g., a wide sheet-like shape.

Further, to achieve the above-described aim, according to the present invention, there is provided a foreign matter detection mechanism used to detect a foreign matter other than a carriage object, comprising: a foreign matter detection member having a foreign matter engagement portion, a cutting edge portion which cuts a foreign matter, and a guide portion which leads the foreign matter to the cutting edge portion; a movement mechanism which moves the foreign matter detection member in a direction crossing a traveling path; and detecting means for detecting presence/absence of foreign matter detection by the foreign matter detection member, wherein the foreign matter is cut by the cutting edge portion or detected by the detecting means.

As described above, the foreign matter detection mechanism including the cutting edge portion at the foreign matter detection member which moves in a crossing direction can detect the foreign matter without damaging an object since it brings the parts other than the cutting edge portion into contact with the object surface. Furthermore, the foreign matter detection member including the cutting edge portion can catch the foreign matter and move it in the crossing direction if the foreign matter is a relatively-thick filiform matter, and it can cut the foreign matter in the middle of the movement if the foreign matter is a thin filiform matter. Therefore, detection or cutting can be enabled when the filiform foreign matter is either thick or thin, thereby improving the security property of the card reader and the like.

Moreover, in this foreign matter detection mechanism, it is preferable that the foreign matter engagement portion of the foreign matter detection member is constituted by a tabular portion, a concave portion which the tabular portion enters is provided to the detecting means, the concave portion is formed to have a width which allows passage of the tabular portion not engaging with the foreign matter and does not allow passage of the tabular portion engaging with the foreign matter, and the foreign matter entering between the concave portion and the tabular portion is cut by the cutting edge portion.

In this case, in cases where the foreign matter is thinner than a gap between the concave portion and the tabular portion, the foreign matter engagement portion can enter the concave portion together with the foreign matter even if it carries the foreign matter. However, if the foreign matter is thicker than the gap, the foreign matter engagement portion cannot enter the concave portion together with the foreign matter. Therefore, detecting a position of the foreign matter engagement portion can detect existence of the foreign matter whose thickness is not less than a predetermined value. In addition, since the thin foreign matter can be readily cut as its thickness gets smaller, it can be cut by the cutting edge portion.

Additionally, it is preferable that the movement mechanism includes a stepping motor and a movement member which has the foreign matter detection member attached thereto and moves by the stepping motor and that the movement mechanism is provided separately from the carriage mechanism for an object. In this case, since the foreign matter detection member can be operated individually and separately from, e.g., a carriage conformation for a card, the foreign matter can be easily detected. Further, the operation control of the foreign matter detection member can be facilitated by the stepping motor, and a position of the foreign matter detection member can be maintained by the holding power of the stepping motor so as to prevent the foreign matter detection member under the tension of the filiform foreign matter from retiring.

Furthermore, in this foreign matter detection mechanism, it is preferable to place an object at a position that the foreign matter detection member crosses when the foreign matter detection member moves in a direction crossing the traveling path, move the object by the carriage mechanism for an object and cut the foreign matter by using the cutting edge portion. In this case, a foreign matter such as a filiform matter caught around a such object as a card can be detected by the foreign matter detection member, and it can be cut by the cutting edge portion under the tension obtained when moving the card.

Moreover, it is preferable that the cutting edge portion in this foreign matter detection mechanism is formed by a cutting surface exposed by moving sections of a notch provided to the foreign matter engagement portion in opposite directions to each other. In this case, the filiform foreign matter can be caught and moved so as not to slide from the cutting point, and the thin filiform foreign matter can be cut by the cutting point. In addition, the cutting edge portion can be readily formed by pushing open the notches by shearing or the like.

BEST MODE FOR CARRYING OUT OF THE INVENTION

The structure of the present invention will now be described in detail hereinafter based on best embodiments.

FIGS. 1 to 6 show a structure of a card reader to which the present invention is applied. This card reader includes in a card traveling path 4 a foreign matter detection mechanism 1 for detecting a foreign matter 3 other than a card (which will be referred to as a card 2 hereinafter) as a carriage object 2. This foreign matter detection mechanism 1 is constituted by a foreign matter detection member 5, a movement mechanism 29 (which will be referred to as a carriage movement mechanism 29 hereinafter) for moving the foreign matter detection member 5 in a direction crossing the card traveling path 4, and detecting means 8 for detecting presence/absence of foreign matter detection by the foreign matter detection member 5.

In this embodiment, the foreign matter detection member 5 is attached to a carriage 13 of the carriage movement mechanism 29 and caused to move. This carriage movement mechanism 29 has a motor 10 as a drive source, and is constituted by attaching the carriage 13, which moves in a predetermined direction, to a loop-like member 12 driven by the motor 10 and attaching the foreign matter detection member 5, which is a body to be moved, to the carriage 13.

Here, one foreign matter detection member 5 can suffice in order to detect a foreign matter, but it is preferable to provide a plurality of the foreign matter detection members 5 so as to divide the card traveling path 4 and perform detection. In this embodiment, a pair of the foreign matter detection members 5 are provided. Therefore, the number of the carriages 13 is also two. It is to be noted that subscripts a and b indicate a pair with respect to members provided in the form of a pair (for example, the foreign matter detection members 5, the detecting means 8 and the like) in this embodiment.

Figure 4:
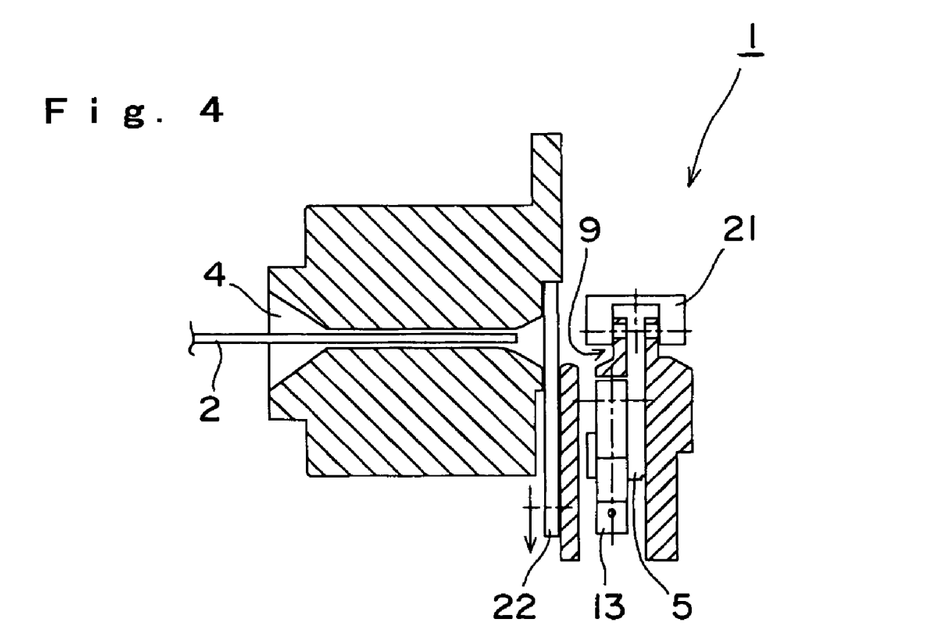
FIG. 4 is a cross-sectional view showing from the right side a structural example from a card insertion opening to the foreign matter detection mechanism.

It is to be noted that the card reader includes a shutter plate 22 which opens and closes the card traveling path 4. Although the shutter plate 22 is not described in detail particularly in this specification, the shutter plate 22 is rotatably supported at both ends thereof by, e.g., a link and moves up and down as shown in FIG. 4 by movement of the link. Moreover, the foreign matter detection mechanism 1 is provided at the rear of the shutter plate 22 as shown in FIG. 4 and detects a foreign matter 3 in an inner area away from the shutter plate 22.

The carriage movement mechanism 29 is a mechanism for moving the foreign matter detection members 5 in a direction crossing the card traveling path 4, includes a stepping motor as a motor 10 (which will be referred to as a "stepping motor 10" hereinafter), a gear train 11, a wire as a loop-like member 12 (which will be referred to as a "wire 12" hereinafter), carriages 13 and rollers 14 in this embodiment, and provided separately from the card carriage mechanism (not shown). The turning force of the stepping motor 10 is transmitted to one roller 14a through the gear train 11.

Figure 1:
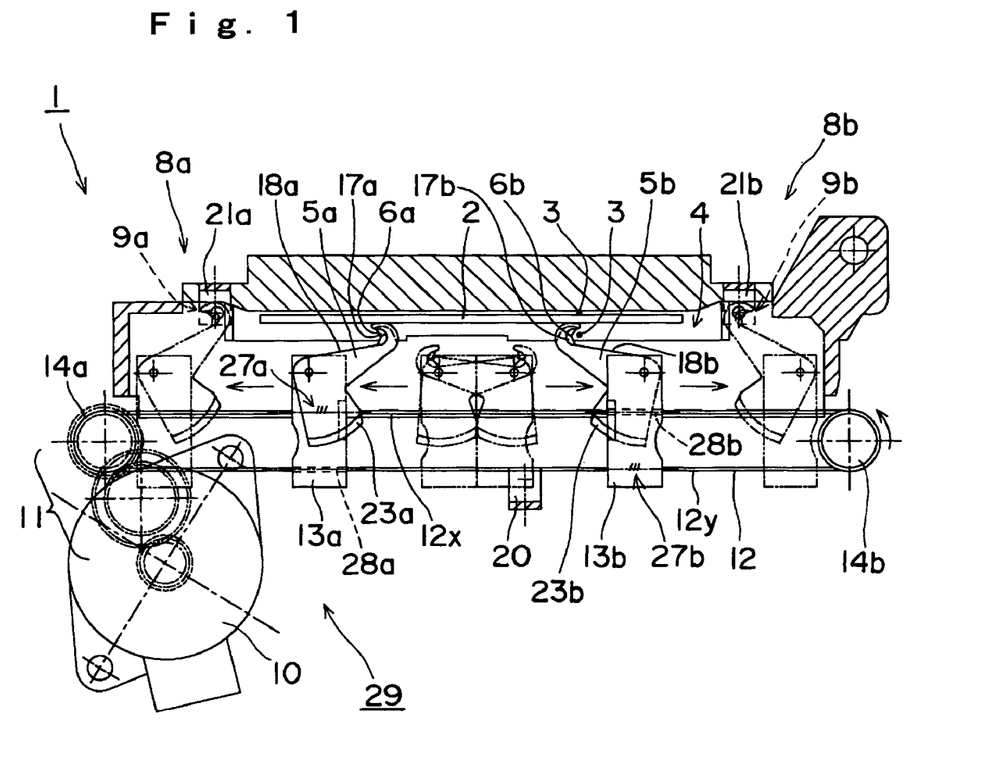
FIG. 1 is a front view showing a primary part of a foreign matter detection mechanism in a card reader according to an embodiment of the present invention.
Figure 2:
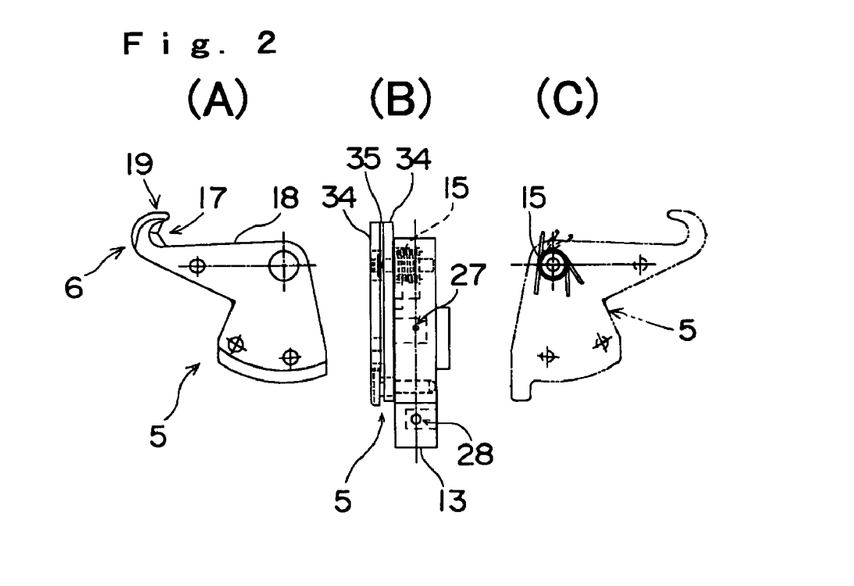
FIG. 2(A) is a front view showing an embodiment of a foreign matter detection member.
FIG. 2(B) is a side view of FIG. 2(A)
FIG. 2(C) is a rear view of FIG. 2(A)
Figure 3:
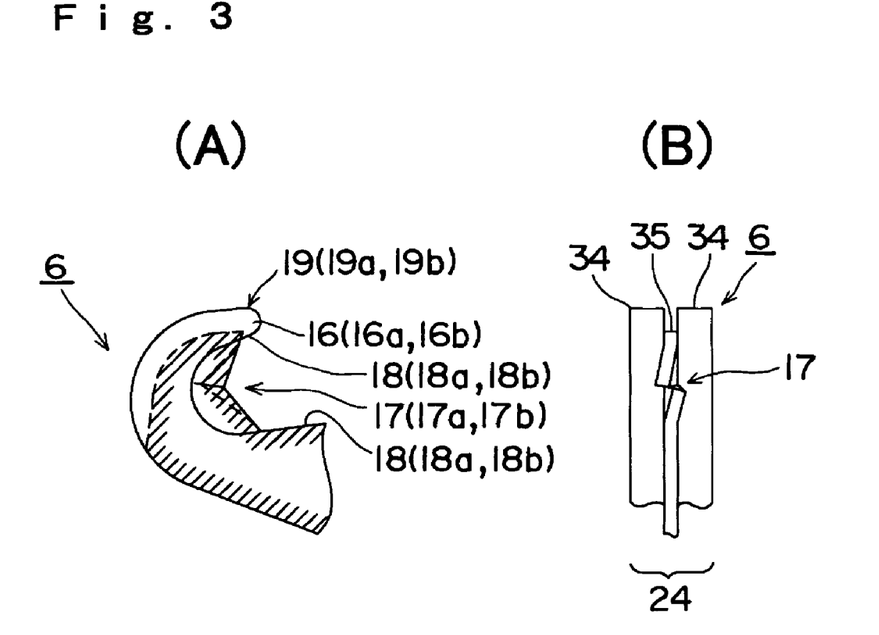
FIG. 3(A) is a front view showing the vicinity of a protruding end of the foreign matter detection member and a shape of a cutting edge portion.
FIG. 3(B) is a side view of FIG. 3(A)

The wire 12 is stretched in the form of a loop between the rollers 14a and 14b at the both ends in the card crossing direction, and moves around in either direction upon receiving the turning force. In this case, as shown in FIG. 1, two parallel portions 12x and 12y are formed to the wire 12 between the rollers 14a and 14b.

A pair of carriages denoted by reference numerals 13a and 13b are attached to the wire 12. For example, one carriage 13a is fixed to the upper parallel portion 12x of the wire 12 in a fixing portion denoted by reference numeral 27a while the other carriage 13b is fixed to the lower parallel portion 12y of the wire 12 in a fixing portion 27b so that the carriages 13a and 13b move in the opposed directions. In this case, when the wire 12 rotates in the counterclockwise direction as shown in FIG. 1, the carriage 13a moves in the left direction in the drawing, and the carriage 13b moves in the right direction.

These carriages 13a and 13b include guide portions 28a and 28b which guide the carriages themselves. The guide portions 28a and 28b are through holes provided to the carriage 13 main body as shown in the drawing so as to cause the wire parallel portion 12y (or 12x) on the opposite side of the parallel portion 12x (or 12y) fixed by the fixing portion 27a (or 27b) to pierce therethrough, for example. The carriage 13a (or 13b) including such a guide portion 28a (or 28b) can move along the wire 12 without rotating around the wire 12.

Further, the foreign matter detection members 5 (5a, 5b) which detect the foreign matter 3 inserted into the card reader are attached to the carriages 13a and 13b. The foreign matter detection member 5 has the foreign matter engagement portion 6 and is rotatably attached to each of the carriages 13a and 13b. The foreign matter detection members 5a and 5b are given impetus in a direction along which they rise by a coil spring 15 such as shown in FIGS. 2(B) and 2(C) (for example, the clockwise direction in case of the foreign matter detection member 5b) so that the foreign matter detection members can move closer to or away from the card traveling path 4. As a result, the foreign matter detection members 5a and 5b thoroughly get across the area where the foreign matter 3 can pass when the card 2 does not exist in the card traveling path 4 and, on the other hand, they move while sliding on the lower surface of the card 2 and check whether there is the foreign matter 3 in the card traveling path 4 when the card 2 exists in the card traveling path 4.

The foreign matter engagement portions 6a and 6b provided on the foreign matter detection members 5a and 5b are formed to catch the foreign matter 3 and move it to the side when the foreign matter 3 exists in the card traveling path 4. In this embodiment, each of the foreign matter engagement portions 6a and 6b is constituted by a tabular portion 24 having a predetermined thickness and has a hook-like shape as shown in FIG. 3(A) so that it can readily catch the foreign matter 3 particularly when the foreign matter 3 has a filate form. The tabular portion 24 has a lamination structure that a middle sheet metal 35 is sandwiched between two resin plates 34 as shown in FIG. 3(B).

Furthermore, in this embodiment, a part of each of the foreign matter engagement portion 6a and 6b which comes into contact with the card 2 (denoted by reference numeral 19 in the drawing) has a gentle curve shape as shown in FIG. 3(A), a protruding end 16 is rounded so as not to be caught by the surface of the curved card 2 or the emboss of the card 2. Alternatively, although not shown, a roller or the like may be provided to the protruding end portion 16 in place of giving roundness, or surface finishing may be applied in order to facilitate sliding.

As shown in FIG. 3(A), it is preferable that the foreign matter engagement portions 6a and 6b include cutting edge portions 17 (17a, 17b) and guide portions 18 (18a, 18b) which lead the foreign matter 3 to the cutting edge portions 17. In this embodiment, the cutting surface is exposed by moving the sections of the notch of the foreign matter engagement portions 6 in the opposite directions to each other by shearing, and the cutting edge portions 17a and 17b are formed by the unevenly opened sheared surfaces (or the sheared edges). A part of the filate foreign matter 3 is caught to be assuredly moved, and cutting of the foreign matter 3 is enabled if the foreign matter 3 is thin. The guide portions 18a and 18b are inclined edges continuous to the cutting edge portions 17a and 17b provided in troughs of the foreign matter engagement portions 6a and 6b.

Moreover, the filate foreign matter 3 may be cut by utilizing the card carrying force. That is, when carrying the card 2, the filate foreign matter 3 is pressed against the cutting edge portions 17 by the tensile force obtained when the card 2 catches and pulls the filate foreign matter 3, and then it is cut. In this case, each foreign matter detection member 5 is maintained at a position obtained when the filate foreign matter 3 is pressed by the holding power of the stepping motor 10 so as not to retire upon receiving the tensile force of the filate foreign matter 3.

In this embodiment, as described above, a pair of the foreign matter detection members 5 are provided, and a central position at which the right and left foreign matter detection members 5a and 5b come into contact with each other is determined as a home position of the foreign matter detection members 5a and 5b as indicated by an imaginary line in FIG. 1. A home position sensor 20 consisting of, e.g., a photo-sensor can detect whether the foreign matter detection members 5a and 5b are placed at the home position. In addition, since the foreign matter detection members 5a and 5b come into contact with each other at the home position and include contact portions 23 (23a, 23b) which cause the foreign matter engagement portions 6a and 6b to rotate so as to retire from the card traveling path 4, the foreign matter engagement portions 6a and 6b rotate in the crossing manner and move away from the card traveling path 4 at the home position (see FIG. 1).

Figure 5:
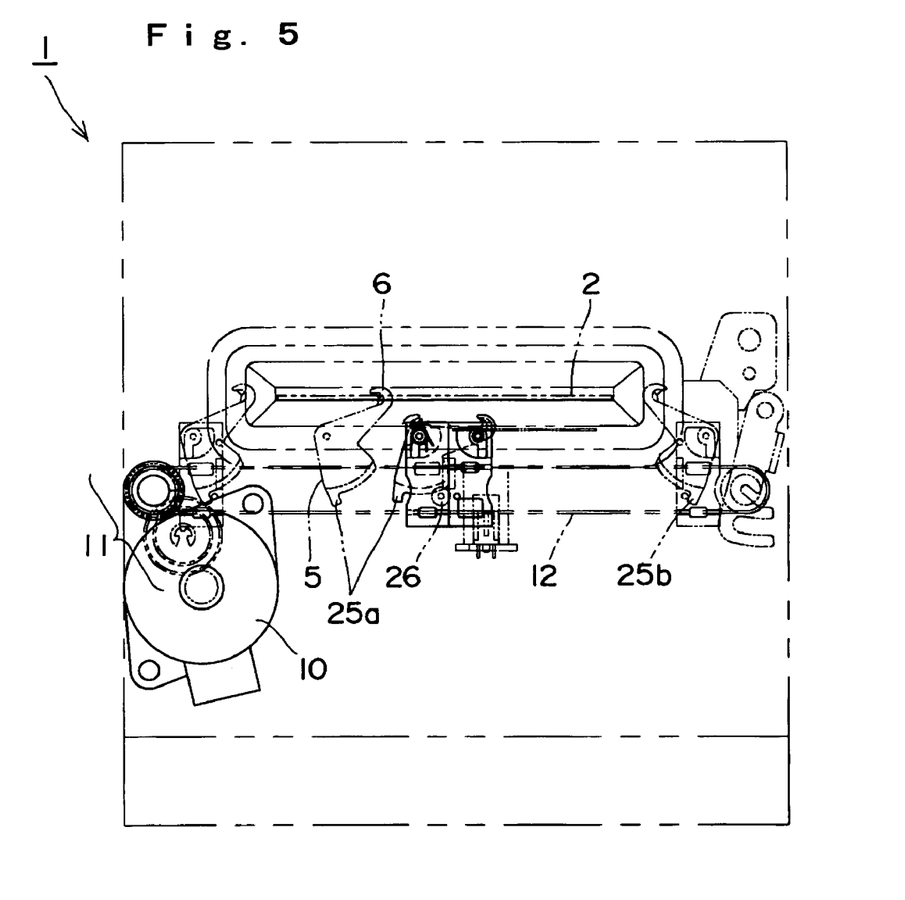
FIG. 5 is a front view of the card reader.

Additionally, as shown in FIG. 5, it is preferable that the foreign matter detection members 5a and 5b include protruding restriction portions 25 (25a, 25b). The restriction portions 25 come into contact with the protruding portions 26 (26a, 26b) provided on the carriages 13, and hold a rising range of the foreign matter detection portions 5a and 5b to an appropriate range.

A pair of the foreign matter detection members 5a and 5b move from the central part (home position) of the card traveling path 4 toward the outer side (side part of the card traveling path 4) in a direction crossing the card traveling path 4. At that time, the scanning strokes of both of the foreign matter detection members 5a and 5b are set wider than the card width by combining each stroke of the foreign matter detection members 5a and 5b so as to enable detection in a larger range than the card width. In this case, there is no missing out on detection when a pair of the foreign matter detection members 5 redundantly scan in the central part. In this embodiment, since scanning an area which is approximately a half of the width of the card traveling path 4 by the respective foreign matter detection members 5a and 5b (and the carriages 13a and 13b) can suffice, the time required for detection is short.

Further, the foreign matter detection mechanism 1 includes detecting means 8 (8a, 8b) which are positioned on the outer side of the card traveling path 4 and detect presence/absence of the foreign matter 3 at the scanning stroke terminals of the foreign matter detection members 5a and 5b. In this embodiment, the detecting means 8 are constituted by photo-sensors 21 (21a, 21b) and provided with concave portions 9 (9a, 9b) which the tabular portions 24 of the foreign matter detection members 5a and 5b enter. Furthermore, each of the concave portions 9a and 9b is formed larger than the width of the tabular portion 24 but smaller than the dimension of the foreign matter 3 to be detected in such a manner that the tabular portion 24 with which the foreign matter 3 is not engaged can pass through the concave portion but the tabular portion 24 with which the foreign matter is engaged cannot pass through the same (see FIG. 6). In this case, if the foreign matter 3 is thicker than the width of a gap between each concave portion 9 and the tabular portion 24, the foreign matter 3 is an obstacle, the foreign matter detection members 5a and 5b which have caught the foreign matter 3 cannot enter the concave portions 9. Therefore, the protruding foreign matter detection members 5a and 5b can be detected by the detecting means 8. On the other hand, the foreign matter 3 which is thin to the extent enabling entrance between each concave portion 9 and the tabular portion 24 can be cut by the above-described cutting edge portions 17.

The operation of the foreign matter detection mechanism 1 according to this embodiment will now be described.

In the card insertion standby state, the foreign matter detection members 5a and 5b are placed at the home position and retired from the card traveling path 4.

Then, when the card 2 is inserted, the card 2 is temporarily stopped after insertion, and the stepping motor 10 is activated to drive the carriages 13a and 13b in the right and left directions. Specifically, as shown in FIG. 1, the wire 12 is rotated in the counterclockwise direction, and the carriages 13a and 13b are moved in the directions along which they are distanced from each other. At this moment, the card 2 is placed at the position of the foreign matter detection members 5 so as to perform movement of the card 2 by the card carriage mechanism and cutting of the foreign matter 3 by the cutting edge portions 17. The foreign matter detection members 5a and 5b are moved from the home position and try to raise the foreign matter engagement portions 6a and 6b. However, since the card 2 is placed on the foreign matter detection members 5, the protruding end portions 16 come into contact with the card 2 and rise is restricted. Then, the foreign matter detection members 5 scan in the horizontal direction toward the outer side from the home position while being in contact with the back side of the card 2.

Here, when the filate foreign matter 3 is set in the card reader, this filate foreign matter 3 is caught by the foreign matter engagement portions 6a and 6b of the foreign matter detection members 5a and 5b. When an amount of slack of the filate foreign matter 3 is small, continuing scanning of the foreign matter detection members 5a and 5b brings the filate foreign matter 3 to the stretch and inhibits the carriage operation, thereby detecting the foreign matter 3. On the other hand, when an amount of slack of the filate foreign matter 3 is large, the foreign matter detection members 5a and 5b which have caught the filate foreign matter 3 do not enter the concave portions 9a and 9b and the foreign matter 3 is detected by the detecting means 8a and 8b. When the foreign matter 3 is detected, processing of the card 2 is interrupted, and the card 2 is returned to the user.

Figure 6:
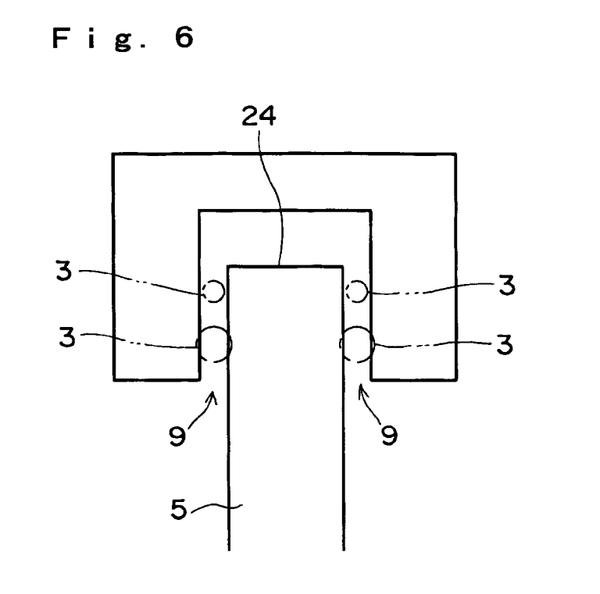
FIG. 6 is a schematic view briefly showing the relationship between a thickness of the foreign matter detection member and a width of a concave portion.

The above has described the case that the filate foreign matter 3 is thicker than a gap between each concave portion 9 and the tabular portion 24. On the contrary, when the filate foreign matter 3 is thinner than the gap between each concave portion 9 and the tabular portion 24, each foreign matter detection member 5 can enter the concave portion 9 together with the filate foreign matter 3 as shown in FIG. 6. In this case, the thin filate foreign matter 3 can be cut by the cutting edge portion 17 of each foreign matter detection member 5.

In contradiction to the above-described case, even when the card 2 is not inserted, scanning/detection by the foreign matter detection members 5a and 5b can be of course performed. In this case, since there is no restriction in rise of the card 2 with respect to the foreign matter detection members 5a and 5b, the foreign matter detection members 5a and 5b can scan the entire area of the card traveling path 4 in the direction of the card width.

As described above, in the foreign matter detection mechanism 1 according to this embodiment, the foreign matter detection members 5 scan the entire area of the card traveling path 4 similar to the prior art when there is no card 2 inserted, and they move back to the position where they come into contact with the card surface and scan all areas other than the area partitioned by the card 2 when there is the card 2 inserted. That is, even when the card 2 exists, since at least the area on one side partitioned by the card 2 is scanned, the foreign matter 3, especially the filate foreign matter 3 which extends to both sides of the card 2 as shown in FIG. 1 can be detected even after insertion of the card.

Therefore, even if, e.g., the filate foreign matter 3 enters the card traveling path 4 when the card is inserted, this foreign matter 3 can be detected by scanning after insertion of the card. Moreover, in cases where the foreign matter 3 is filate, detection is possible irrespective the string is slack or tight, and the high detection capability is demonstrated, thereby further improving the security property of the card reader.

In addition, the cutting edge portions 17 are provided to the foreign matter engagement portions 6 of the foreign matter detection members 5, and the foreign matter detection members 5 move in the crossing direction so as to bring the parts other than the cutting edge portions 17 into contact with the card surface, thereby detecting the foreign matter 3 without damaging the card 2. Additionally, when the filate foreign matter 3, which is thin to the extent allowing entrance between each concave portion 9 and each tabular portion 24 and cannot be detected by the detecting means 8 is caught, this filate member 3 can be cut at the midpoint thereof, and hence a subsequent fraudulent action can be avoided even if the filate foreign matter 3 cannot be detected because it is too thin.

It is to be noted that the above is a preferred embodiment according to the present invention but the present invention is not restricted thereto, and various modifications and variations can be carried out without departing from the scope of the invention. For example, description has been given as to the case that each carriage 13 is a moving member to which each foreign matter detection member 5 for detecting the foreign matter 3 inserted into the card reader is attached in this embodiment, the function of the carriage 13 is not restricted thereto. Besides, the carriage 13 may be a carriage 13 on which the card 2 is mounted or a carriage 13 having a magnetic head attached thereto. That is, the carriage movement mechanism 29 can be applied as a mechanism for moving each carriage 13 in the foreign matter detection mechanism 1 in the card reader as well as a mechanism for moving the magnetic head, the card and others in predetermined directions.

Further, description has been given on the conformation that the foreign matter 3 set in the card reader is detected by the foreign matter detection mechanism 1 in this embodiment, and this foreign matter detection mechanism 1 can be applied to any device other than the card reader. For example, it can be applied as a device for detecting the foreign matter 3 in an apparatus having paper currency as a carriage object.

Furthermore, the detecting means 8 in this embodiment detect the foreign matter 3 by detecting the foreign matter detection members 5 by the photo-sensors 21 when the foreign matter detection members 5 can not enter the concave portions 9 because the foreign matter 3 is an obstacle, but the structure of the detecting means 8 is not restricted thereto. Although not described in detail, existence of the foreign matter 3 may be detected by, e.g., a mechanical sensor which operates with a tension weaker than the tensile force of the filate foreign matter 3. Alternatively, a movement lever which scans the front side of each concave portion 9 may be operated, and positional detection may be mechanically performed by checking whether the movement lever comes into contact with the foreign matter detection members 5 which do not completely enter the concave portions 9. Furthermore, a pair of metal pieces are oppositely arranged, and when the filate foreign matter 3 is sandwiched therebetween, the pair of metal pieces cannot come into contact with each other, and detection whether the filate foreign matter 3 exists may be electrically performed based on a change in the electrostatic capacity.

Moreover, although the foreign matter detection members 5 are moved by utilizing the wire 12 in the carriage movement mechanism 29 in this embodiment, any other loop-like member such as a belt may be used in place of the wire 12. In addition, a DC motor or the like may be used as a drive source of the wire 12 and others instead of the stepping motor 10.

In addition, the above has described the conformation that a pair of the foreign matter detection members 5a and 5b simultaneously move from the central part to the outer side, but the single foreign matter detection member 5 may be used to scan the entire area. In this case, although the scanning stroke must be set longer and the foreign matter detection member 5 must be moved from one end to the other end, the foreign matter detection mechanism 1 can be constituted by a single member, which results in the structure simpler than the foreign matter detection mechanism 1 according to this embodiment.

Additionally, the wire through holes provided to the carriages 13 are illustrated as the example of the guide portions 28a and 28b in this embodiment, but the present invention is not restricted thereto. For example, the guides 28a and 28b can be formed by engagement grooves including drop preventing claws by which the wire 12 is hard to come off.

Figure 7:
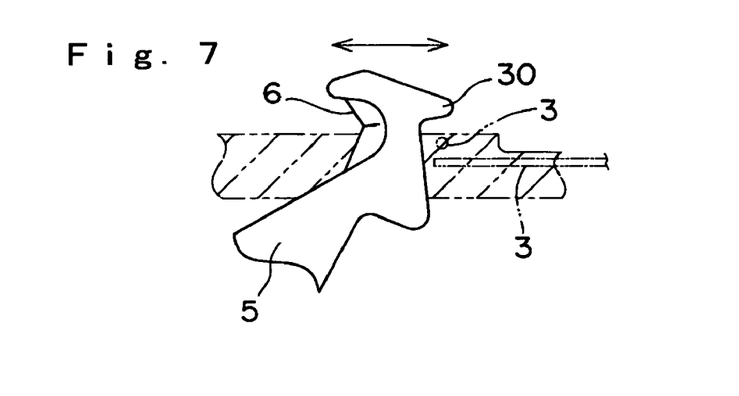
FIG. 7 is a view showing the periphery of a foreign matter engagement portion of the foreign matter detection member in the card reader according to a second embodiment of the present invention.
Figure 9:
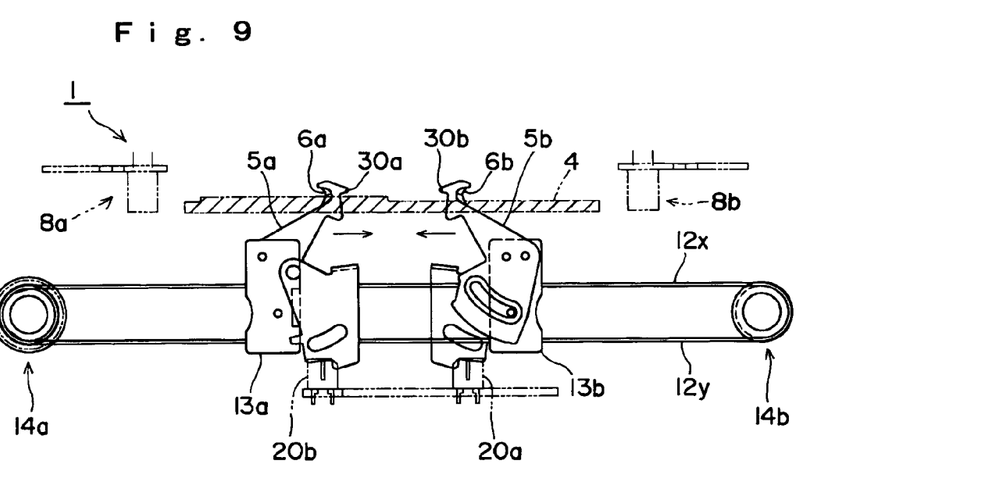
FIG. 9 is a front view showing a primary part of the foreign matter detection mechanism.

The second embodiment according to the present invention will now be described. In this embodiment, as shown in FIG. 9, a foreign matter engagement portion is provided to the respective foreign matter detection members 5a and 5b in both directions along which the foreign matter detection members 5a and 5b move. In cases where two foreign matter engagement portions are provided, a pair of the foreign matter engagement portions 6 described in connection with the first embodiment can be used. In this embodiment, however, as shown in FIG. 7, the above-described foreign matter engagement portion 6 is combined with another foreign matter engagement portion 30 consisting of a protrusion.

Figure 10:
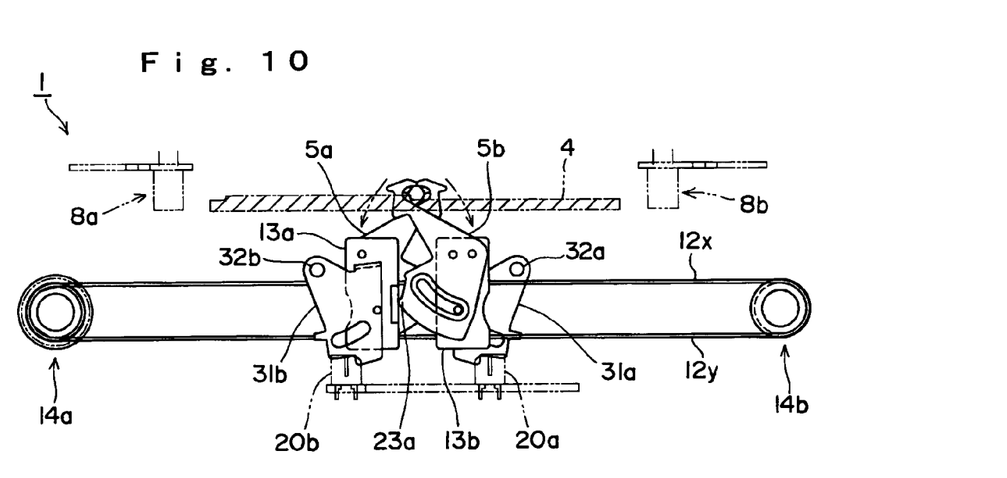
FIG. 10 is a front view showing a primary part of the foreign matter detection mechanism.

In this case, the foreign matter 3 can be detected when the foreign matter detection member 5 moves in either direction. For example, even if the filate foreign matter 3 cannot be detected by the foreign matter engagement portion 6 (see FIG. 7), the foreign mater 3 can be caught by the foreign matter engagement portion 30 and detected by moving the foreign matter detection member 5 in the opposite direction. Additionally, in cases where the foreign matter 3 has a sheet-like shape as shown in FIG. 7 and is wide to the extent that it cannot be caught by the foreign matter engagement portion 6 when the foreign matter detection member 5 is changed from the standby state shown in FIG. 11 to the upright state shown in FIG. 10, the edge of the sheet-like foreign matter 3 can be caught by the foreign matter engagement portion 30 and detected by moving the foreign matter detection member 5 in the opposite directions. Therefore, according to the carriage movement mechanism of this embodiment, missing out on detection of the foreign matter 3 is reduced.

In this embodiment, home position sensors 20a and 20b are provided to the foreign matter detection members 5a and 5b, respectively. Further, in this embodiment, the home position sensors 20a and 20b do not directly detect the carriages 13a and 13b as moving members but detect them through intermediary members 31a and 31b.

Figure 8:
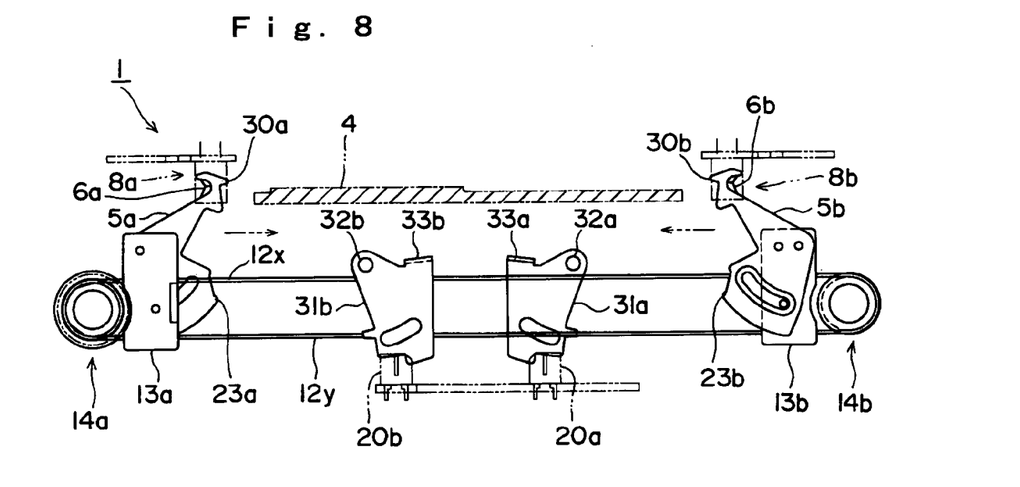
FIG. 8 is a front view showing a primary part of the foreign matter detection mechanism according to the second embodiment of the present invention.

As shown in FIG. 8, the intermediary members 31a and 31b are tabular members provided so as to be capable of rotating around supporting points 32a and 32b, respectively. They are given impetus by non-illustrated impetus giving means and retired to positions which cannot be detected by the home position sensors 20a and 20b in the regular state (FIG. 8). Further, the intermediary members 31a and 31b include contact portions 33a and 33b with which the foreign matter detection members 5a and 5b come into contact, and work with each other upon receiving movement of the foreign matter detection members 5a and 5b. The contact portions 33a and 33b are formed by bending a part of each of the tabular intermediary members 31a and 31b, for example.

The operation of the foreign matter detection mechanism 1 will now be described hereinafter.

The respective foreign matter detection members 5a and 5b which have detected the foreign matter 3 move to the furthermost positions shown in FIG. 8 and can be detected by the detecting means 8a and 8b. At this moment, as described above, the intermediary members 31a and 31b retire to the positions at which the home position sensors 20a and 20b are not blocked by the effect of the impetus giving means.

Then, the carriages 13a and 13b and the foreign matter detection members 5a and 5b are moved in the direction along which they move closer to each other, and returned to the home position (FIG. 9). During this movement, the foreign matter detection members 5a and 5b again scan the card traveling path 4, and cause the existing foreign matter 3 to engage with the foreign matter engagement portions 30a and 30b, thereby enabling detection.

Figure 11:
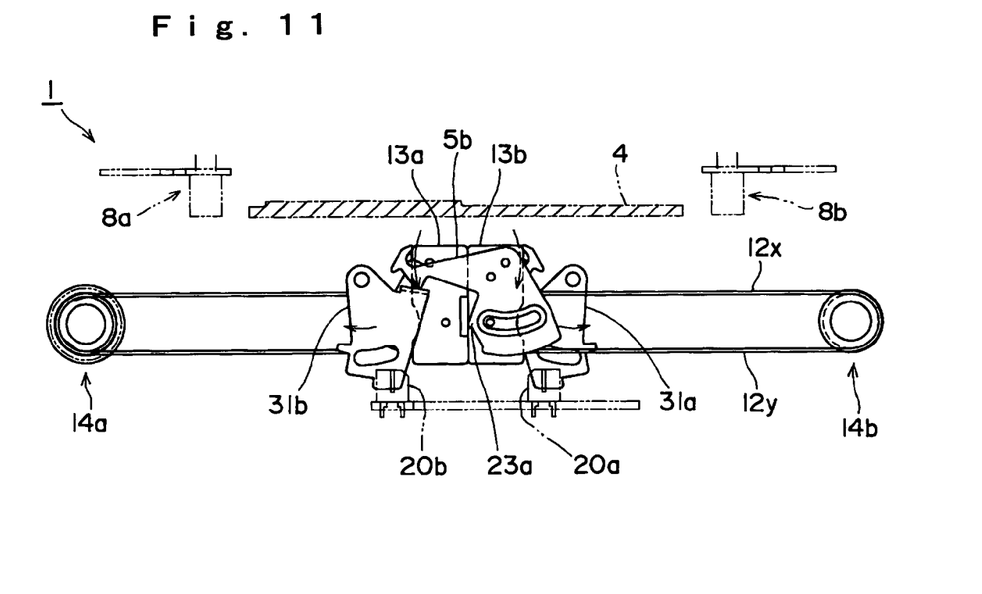
FIG. 11 is a front view showing a primary part of the foreign matter detection mechanism.

Moreover, when the carriages 13a and 13b and the foreign matter detection members 5a and 5b are further moved closer to each other, the foreign matter detection member 5a (5b) receives the reactive force from the contact portion 23a (23b) which has come into contact with the carriage 13b (13a) (FIG. 10), and rotates so as to retire from the card traveling path 4. At this moment, as shown in FIG. 11, a part of the foreign matter detection member 5a (5b) is brought into contact with the contacted portion 33a (33b), rotates the intermediary member 31a (31b), and blocks the home position sensor 20a (20b). As a result, the home position sensors 20a and 20b indirectly detect that the foreign matter detection members 5a and 5b are placed at the home position.

Here, if the end sides of the foreign matter detection members 5 including the foreign matter engagement portions 6 and 30 become defective and cannot come into contact with the contacted portions 33 of the intermediary members 31, the intermediary members 31 do not rotate from the retired position even though the foreign matter detection members 5 are fully moved. Thus, arrival to the home position cannot be detected. In this case, it is possible to determine that the end side of the foreign matter detection members 5 are defective based on the above-described situations without using the detecting means 8. Therefore, even if the foreign matter detection members 5 are intentionally destroyed, the defective state can be confirmed at the home position.

It is to be noted that the contact portion 23 on each foreign matter detection member 5 may be a simple protrusion, but the contact portion 23 in this embodiment is constituted by two symmetrical protrusions each having arc surface as shown in FIG. 11 and others. In this case, the contact part changes from one protrusion to the other protrusion during rotation of the foreign matter detection member 5 (see FIGS. 10 and 11).

What is claimed is:

1. A foreign matter detection mechanism for detecting a foreign matter other than a carriage object, comprising: a foreign matter detection member having a foreign matter engagement portion and being able to move closer to or away from a traveling path of the object; a movement mechanism for moving the foreign matter detection member in a direction crossing the traveling path; and detecting means for detecting presence/absence of foreign matter detection by the foreign matter detection member, wherein the foreign matter detection member is attached to the movement mechanism so as to thoroughly cut across an area through which the foreign matter can pass when the object does not exist in the traveling path and move while sliding on a lower surface of the object when the object exists in the traveling path; the foreign matter engagement portion of the foreign matter detection member being constituted by a tabular portion, a concave portion which the tabular portion can enter is provided to the detecting means, and the concave portion being formed to have a width which allows passage of the tabular portion with which the foreign matter is not engaged and does not allow passage of the tabular portion with which the foreign matter is engaged.

2. The foreign matter detection mechanism according to claim 1, wherein the detecting means is arranged outside the traveling path, and the foreign matter detection member is provided so as to cut across the traveling path and perform detection in a wider range than a width of the object.

3. A foreign matter detection mechanism for detecting a foreign matter other than a carriage object, comprising: a foreign matter detection member having a foreign matter engagement portion and being able to move closer to or away from a traveling path of the object; a movement mechanism for moving the foreign matter detection member in a direction crossing the traveling path; and detecting means for detecting presence/absence of foreign matter detection by the foreign matter detection member, wherein the foreign matter detection member is attached to the movement mechanism so as to thoroughly cut across an area through which the foreign matter can pass when the object does not exist in the traveling path and move while sliding on a lower surface of the object when the object exists in the traveling path; wherein a plurality of the foreign matter detection members are provided so as to divide the traveling path and perform detection; and wherein the foreign matter detection member consists of a pair of members which move from the central part of the traveling path to the outer sides respectively and perform redundant detection at the central part.

4. A foreign matter detection mechanism for detecting a foreign matter other than a carriage object, comprising: a foreign matter detection member having a foreign matter engagement portion, a cutting edge portion for cutting the foreign matter, and a guide portion for leading the foreign matter to the cutting edge portion; a movement mechanism for moving the foreign matter detection member in a direction crossing a traveling path; and detecting means for detecting presence/absence of foreign matter detection by the foreign matter detection member, wherein the foreign matter is cut when present by the cutting edge portion, and the foreign matter is detected by preventing the foreign matter detection member from entering the detecting means due to the presents of the foreign matter when failed to be cut.

5. The foreign matter detection mechanism according to claim 4, wherein the foreign matter engagement portion of the foreign matter detection member is constituted by a tabular portion, a concave portion which the tabular portion enters is provided to the detecting means, the concave portion is formed to have a width which allows passage of the tabular portion with which the foreign matter is not engaged and does not allow passage of the tabular portion with which the foreign matter is engaged, and the foreign matter entering between the concave portion and the tabular portion is cut by the cutting edge portion.

6. The foreign matter detection mechanism according to claim 4, wherein the movement mechanism includes a stepping motor and a moving member which has the foreign matter detection member attached thereto and is moved by the stepping motor, and is provided separately from a carriage mechanism for the object.

7. The foreign matter detection mechanism according to claim 6, wherein, when the foreign matter detection member moves in a direction crossing the traveling path, the object is placed at a position that the foreign matter detection member cuts across, the object is moved by the carriage mechanism for the object, and the foreign matter is cut by the cutting edge portion.

8. The foreign matter detection mechanism according to claim 4, wherein the cutting edge portion is formed by a cutting surface exposed by moving sections of a notch provided to the foreign matter engagement portion in opposite directions to each other.

\* \* \* \* \*